(12) United States Patent
Ise (10) Patent No.: US 8,558,934 B2
(45) Date of Patent: Oct. 15, 2013

(54) IMAGE SENSING APPARATUS AND CONTROL METHOD THEREFOR, AND IMAGE PROCESSING APPARATUS AND REDUCTION METHOD

(75) Inventor: Makoto Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 12/431,406

(22) Filed: Apr. 28, 2009

(65) Prior Publication Data

US 2009/0278970 A1    Nov. 12, 2009

(30) Foreign Application Priority Data

May 8, 2008    (JP) .................................. 2008-122775

(51) Int. Cl.
*H04N 3/14*    (2006.01)
*H04N 5/335*    (2011.01)

(52) U.S. Cl.
USPC .......................................... 348/312; 348/294

(58) Field of Classification Search
USPC ........................... 348/312, 311, 315, 316, 294
See application file for complete search history.

(56) References Cited

U.S. PATENT DOCUMENTS 6,476,941 B1    11/2002    Kondo
2008/0246870 A1*    10/2008    Shimono et al. .............. 348/311

FOREIGN PATENT DOCUMENTS

| JP | 2000-032353 A | 1/2000 |
| JP | 2002-010144 A | 1/2002 |
| JP | 2005-045552 A | 2/2005 |
| JP | 2005-269060 A | 9/2005 |
| JP | 3715781 B | 11/2005 |
| JP | 2006-094474 A | 4/2006 |
| JP | 2007-097018 A | 4/2007 |

OTHER PUBLICATIONS

The above references were cited in a Sep. 10, 2012 Japanese Office Action, a copy of which is enclosed without an English Translation, that issued in Japanese Patent Application No. 2008-122775.

* cited by examiner

*Primary Examiner* — Alicia M Harrington
(74) *Attorney, Agent, or Firm* — Cowan, Liebowitz & Latman, P.C.

(57) ABSTRACT

An image sensing apparatus has an image sensor including two-dimensionally arranged photoelectric conversion elements, a VCCD for transferring in a vertical direction electric charge accumulated in the photoelectric conversion elements, and a HCCD for transferring in a horizontal direction the electric charge transferred from the VCCD, the image sensor for carrying out transfer of electric charge by the VCCD during transfer of electric charge by the HCCD; a noise reduction unit for reducing noise including noise caused by driving the VCCD from an image signal output from the HCCD; and a control unit for controlling whether or not noise reduction is to be carried out based on at least one of the sensitivity, shutter speed, and temperature of the image sensor.

8 Claims, 9 Drawing Sheets

DURING LOWER SENSITIVITY (A < A1)

| TEMPERATURE | SHUTTER SPEED | | |
|---|---|---|---|
|  | s < s1 | s1 ≤ s ≤ s2 | s2 < s |
| T < T1 | REDUCTION OFF | REDUCTION OFF | REDUCTION OFF |
| T1 < T ≤ T2 | REDUCTION OFF | REDUCTION OFF | REDUCTION ON |
| T2 < T | REDUCTION OFF | REDUCTION ON | REDUCTION ON |

DURING LOWER SENSITIVITY (A < A1)

| TEMPERATURE | SHUTTER SPEED | | |
|---|---|---|---|
| | s < s1 | s1 < s ≤ s2 | s2 < s |
| T < T1 | REDUCTION OFF | REDUCTION OFF | REDUCTION OFF |
| T1 < T ≤ T2 | REDUCTION OFF | REDUCTION OFF | REDUCTION ON |
| T2 < T | REDUCTION OFF | REDUCTION ON | REDUCTION ON |

FIG. 3B

DURING HIGHER SENSITIVITY (A1 ≤ A)

| TEMPERATURE | SHUTTER SPEED | | |
|---|---|---|---|
| | s < s3 | s3 < s ≤ s4 | s4 < s |
| T < T3 | REDUCTION OFF | REDUCTION OFF | REDUCTION ON |
| T3 < T ≤ T4 | REDUCTION OFF | REDUCTION ON | REDUCTION ON |
| T4 < T | REDUCTION ON | REDUCTION ON | REDUCTION ON |

Prior Art

IMAGE SENSING APPARATUS AND CONTROL METHOD THEREFOR, AND IMAGE PROCESSING APPARATUS AND REDUCTION METHOD

BACKGROUND OF THE INVENTION

1. Field of the Invention

The present invention relates to an image sensing apparatus and a control method therefor, and to an image processing apparatus and a noise reduction method, and more particularly, to an image sensing apparatus for reducing noise caused by driving an image sensor, and a control method therefor, and to an image processing apparatus and a noise reduction method.

2. Description of the Related Art

Recently, image sensing apparatuses such as digital cameras have been actively developed that record and play back images sensed by solid-state image sensors such as CCDs, with the use of, as a recording medium, a memory card including a solid-state memory element, and have become widespread. Behind such wide diffusion lies the spread of personal computers (PCs) that are able to input and process images shot with a digital camera, increased demand for digital image information through the utilization of the Internet or the like, and so on.

Then, digital still cameras, which function mainly to store still images, and digital video cameras, which function mainly to store moving images, each have started to have the ability to store both still images and moving images. Accordingly, market needs for improvement in resolution and operating speed for still image and moving image shooting have been increasing year by year.

Moreover, recently, in addition to improvements in resolution and operating speed, the ability to carry out shooting easily with fewer failures has been required ever more in a variety of shooting scenes. Therefore, shutter speed has been increased in order to follow objects moving fast, such as (for example) athletes in motion or for the purpose of avoiding blurring of images due to hand movement in indoor shooting under low-intensity illumination. Furthermore, in order to enable high-sensitivity shooting in areas in which no flash photography is allowed, such as museums and aquariums, the high degree of sensitivity involved in still image and moving image shooting has become even greater.

On the other hand, in image sensing apparatuses using solid-state image sensors such as CCDs, a driving method for reading is used in which transfer by vertical transfer registers is carried out in parallel with transfer of electric charge of pixels in an effective area from horizontal transfer registers in order to increase the continuous shooting speed in still image shooting and the frame rate in moving image shooting. However, this driving method has the problem of crosstalk noise being superimposed on signals of pixels in an effective area (hereinafter, referred to as "effective pixel signals") read out from the horizontal transfer registers, at the timings of rising and dropping driving pulses for vertical transfer (vertical transfer pulses).

It is difficult to prevent the above-described crosstalk noise due to the vertical transfer pulses from being superimposed, because the noise leaks into the effective pixel signals through various transmission paths, such as a path between substrates or between signal electrodes inside an image sensor. Furthermore, the above-described crosstalk noise due to the vertical transfer pulses is disadvantageous in being also more likely to be visually noticeable as image noise, because the crosstalk noise will be vertical noise superimposed on effective pixel signals in the same column positions for each horizontal line.

Figure 8:
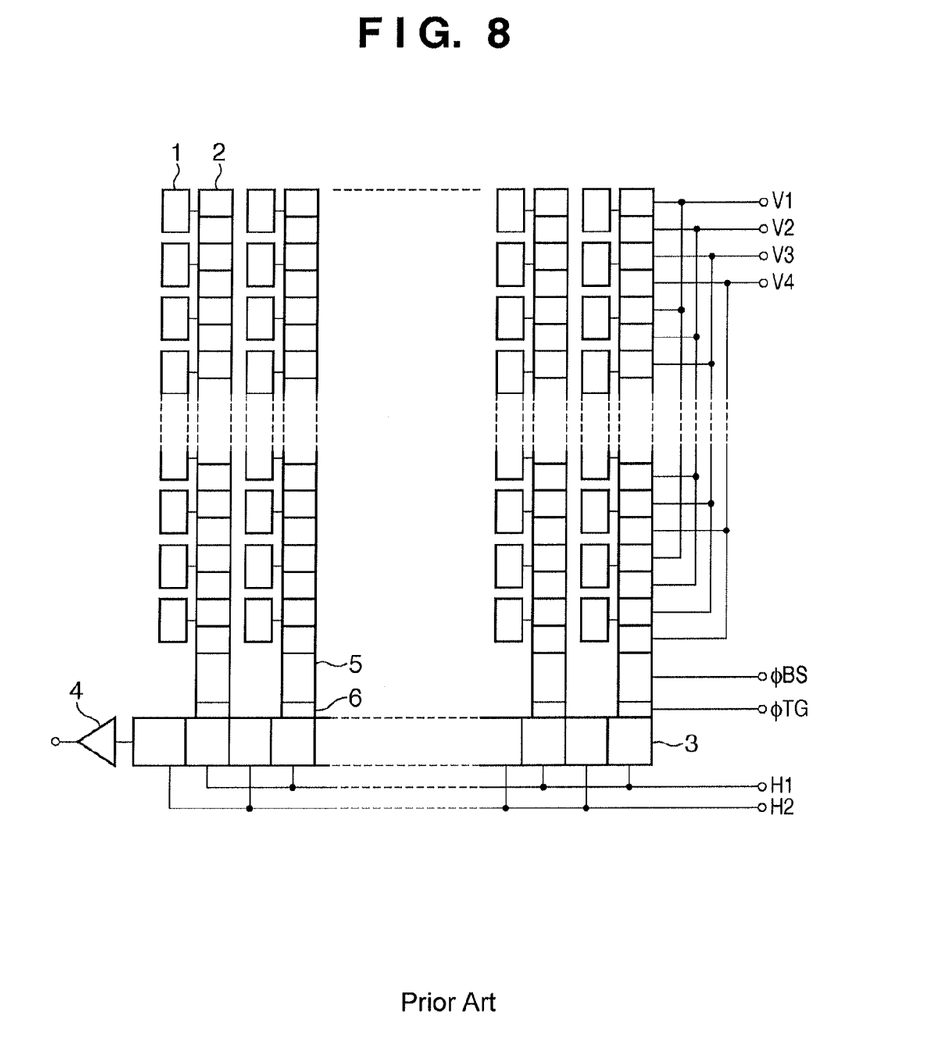
FIG. 8 is a diagram illustrating a schematic configuration of a conventional image sensor.

Now, an example of the configuration of the conventional image sensor described above will be described. FIG. 8 is a diagram illustrating a schematic configuration of an image sensor (CCD).

In the figure, reference 1 denotes PD (photo diodes) that are photoelectric conversion elements, which are two-dimensionally arranged in rows and columns. Reference numeral 2 denotes a vertical CCD (VCCD), which refers to multiple vertical transfer registers for transferring the signal charge of the PD 1 in the vertical direction (column direction), and typically has a four-phase drive configuration.

Reference numeral 3 denotes a horizontal CCD (HCCD) for transferring signal charge for each line transferred from the VCCD 2, and typically has a two-phase drive configuration. Reference numeral 4 denotes an output amplifier for converting signal charges for each pixel transferred from the HCCD 3 into a voltage signal, and outputting the voltage signal.

Reference numeral 5 denotes buffer storage cells (BS) for temporarily accumulating signal charge for one line transferred from the VCCD 2 until being transferred to the HCCD 3, and reference numeral 6 denotes transfer gates (TG) between the BS 5 and the HCCD 3.

In FIG. 8, vertical transfer pulses V1, V2, V3, V4 are respectively applied to four transfer electrodes of the VCCD 2, whereas horizontal transfer pulses H1, H2 are respectively transferred to two transfer electrodes of the HCCD 3.

Figure 9:
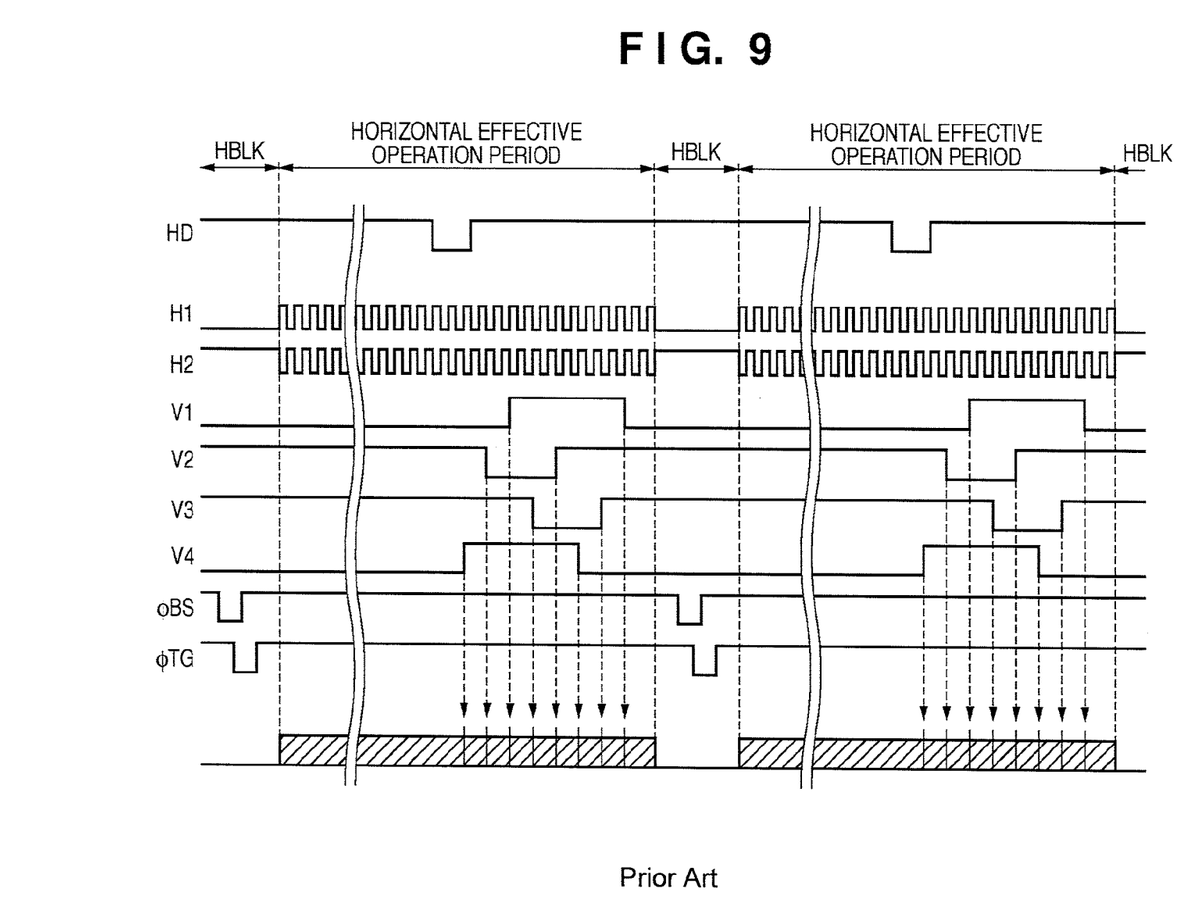
FIG. 9 is a timing chart for explaining an example of a conventional image sensing drive method.

FIG. 9 is a timing chart for explaining a conventional image sensing drive method for the image sensor having the configuration shown in FIG. 8, which shows timings of outputting signal charges of the CCDs to the output amplifier 4 by the VCCD 2 and the HCCD 3.

Further, as shown in the timing chart of FIG. 9, the horizontal blanking period (HBLK) is reduced in such a way that the operation of signal charge transfer by the VCCD 2 is carried out temporally in parallel with the horizontal effective operation period, that is, the transfer operation by the HCCD 3.

However, every time the transfer operation by the VCCD 2 is carried out during the horizontal effective operation period, crosstalk noise will be generated inside the CCDs at the timings of rising and dropping each of the vertical transfer pulses V1, V2, V3, V4 applied to the VCCD 2, thereby resulting in the crosstalk noise superimposed on image sensing voltage signals (CCD outputs) eventually read out from the output amplifier 4.

The crosstalk noise due to the vertical transfer pulses are superimposed as about the same level of noises, always on the pixels in the same horizontal positions for each horizontal line, as indicated by downwards arrows in FIG. 9. Therefore, the crosstalk noise appears as vertical noise on two-dimensional images of the horizontal lines arranged. Furthermore, the read image sensing voltage signals are amplified by a gain amplifier, not shown in the figure, for switching the sensitivity, which is located at the subsequent stage to the output amplifier 4. Therefore, in a case in which the sensitivity is set higher in the image sensing apparatus, that is, in a case in which the amplification of the gain amplifier is larger, the crosstalk noise will become recognizable and more likely to be noticeable.

In order to deal with the problems described above, a technique is disclosed for achieving reduction in read time and improvement in frame rate by using the driving method described above during the period for reading out unneeded electric charges only when partial reading is carried out from an image sensor (see Japanese Patent No. 3715781)

Furthermore, a technique is disclosed for reducing the influence of crosstalk noise superimposed on effective pixel signals by reducing the slopes of, or controlling the timing of, rising and dropping of the vertical transfer pulses (see Japanese Patent Laid-Open No. 2005-269060).

However, while the technique disclosed in Japanese Patent No. 3715781 is effective in a case in which reading from a portion of an effective pixel area is carried out, such as in photometric operation and electronic zoom operation, speeding up is not possible in the operation of reading out normal still images or moving images.

Furthermore, the technique described in Japanese Patent Laid-Open No. 2005-269060 fails to completely eliminate the influence of the crosstalk noise superimposed on the effective pixel signals, thereby producing residual noise components. In a case in which the sensitivity condition is set higher in the image sensing apparatus and the amplification is larger for image sensing signals of the image sensing circuit, even faint noise components will be recognizable as image noise. This becomes a factor hindering increase in the sensitivity of the image sensing apparatus.

SUMMARY OF THE INVENTION

The present invention has been made in consideration of the above situation, and is provided to reduce the influence of crosstalk noise in image signals obtained by shooting, without lowering the frame rate in shooting.

According to the present invention, the foregoing object is attained by providing an image sensing apparatus comprising: an image sensor comprising two-dimensionally arranged photoelectric conversion elements, a first electric charge transfer unit for transferring in a vertical direction electric charge accumulated in the photoelectric conversion elements, and a second electric charge transfer unit for transferring in a horizontal direction the electric charge transferred from the first electric charge transfer unit; a driving unit configured to drive the first and second electric charge transfer units such that electric charge transfer operation by the first electric charge transfer unit and electric charge transfer operation by the second electric charge transfer unit are carried out in parallel; and a control unit configured to control the driving unit such that the phase of a driving pulse of the first electric charge transfer unit with respect to a driving pulse of the second electric charge transfer unit is randomly shifted for each transfer of one horizontal line by the second electric charge transfer unit.

According to the present invention, the foregoing object is also attained by providing a control method for an image sensing apparatus comprising an image sensor comprising two-dimensionally arranged photoelectric conversion elements, a first electric charge transfer unit for transferring in a vertical direction electric charge accumulated in the photoelectric conversion elements, and a second electric charge transfer unit for transferring in a horizontal direction the electric charge transferred from the first electric charge transfer unit, wherein the first and second electric charge transfer units are controlled such that electric charge transfer operation by the first electric charge transfer unit and electric charge transfer operation by the second electric charge transfer unit are carried out in parallel, and the phase of a driving pulse of the first electric charge transfer unit with respect to a driving pulse of the second electric charge transfer unit is randomly shifted for each transfer of one horizontal line by the second electric charge transfer unit.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

First Embodiment

Figure 1:
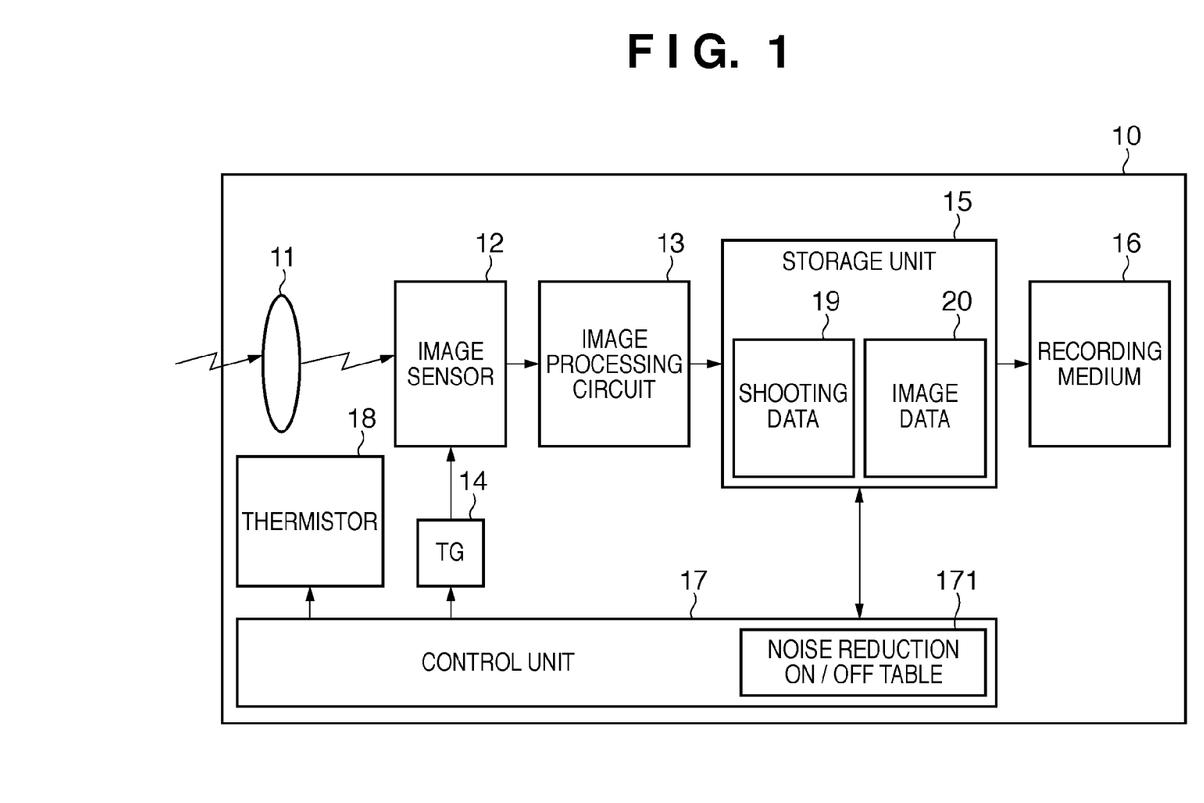
FIG. 1 is a block diagram illustrating a schematic configuration of an image sensing apparatus according to a first embodiment of the present invention.

FIG. 1 is a block diagram illustrating a schematic configuration of an image sensing apparatus 10 according to a first embodiment of the present invention.

In FIG. 1, reference numeral 12 denotes an image sensor composed of CCDs or the like, which has photoelectric conversion elements for converting incident light into electric signals, and the image sensor 12 has essentially the same configuration as that shown in FIG. 8. More specifically, the image sensor 12 has the vertical CCDs 2, which are multiple vertical transfer registers for transferring signal charges of the PDs 1 in the vertical direction (column direction), and the horizontal CCDs 3 for transferring the signal charge for each line, which has been transferred from the VCCD, in the horizontal direction (row direction). The image sensor 12 has a dummy pixel unit from which signals are read out with no connection to the photoelectric conversion elements, an OB unit that is a pixel unit optically shielded from light, and an effective pixel unit that is not optically shielded from light and which generates image data in response to light from an object. Reference numeral 11 denotes a lens for concentrating light from an object onto the image sensor 12.

Reference numeral 13 denotes an image processing circuit, which includes an A/D converter for converting analog image signals output from the image sensor 12 into digital image signals, and reference numeral 14 denotes a timing generator (TG) for generating pulses which drive the image sensor 12.

Reference numeral 15 denotes a storage unit composed of a RAM, which includes a storage area 19 for storing shooting data and a storage area 20 for storing image data. Reference numeral 16 denotes a recording medium (a CompactFlash (Registered Trademark) card or a SD card in the embodiment)

removable from the image sensing apparatus 10, on which image data temporarily stored in the storage area 20 is ultimately recorded.

Furthermore, reference numeral 17 denotes a control unit (CPU) for controlling the whole image sensing apparatus 10. A noise reduction ON/OFF table 171, in which conditions for determining whether or not vertical line noise reduction is to be carried out are described in advance as described later, is stored in an internal memory of the control unit 17, which is not shown in the figure. Reference numeral 18 denotes a thermistor for measuring the ambient temperature of the image sensor 12.

Figure 2:
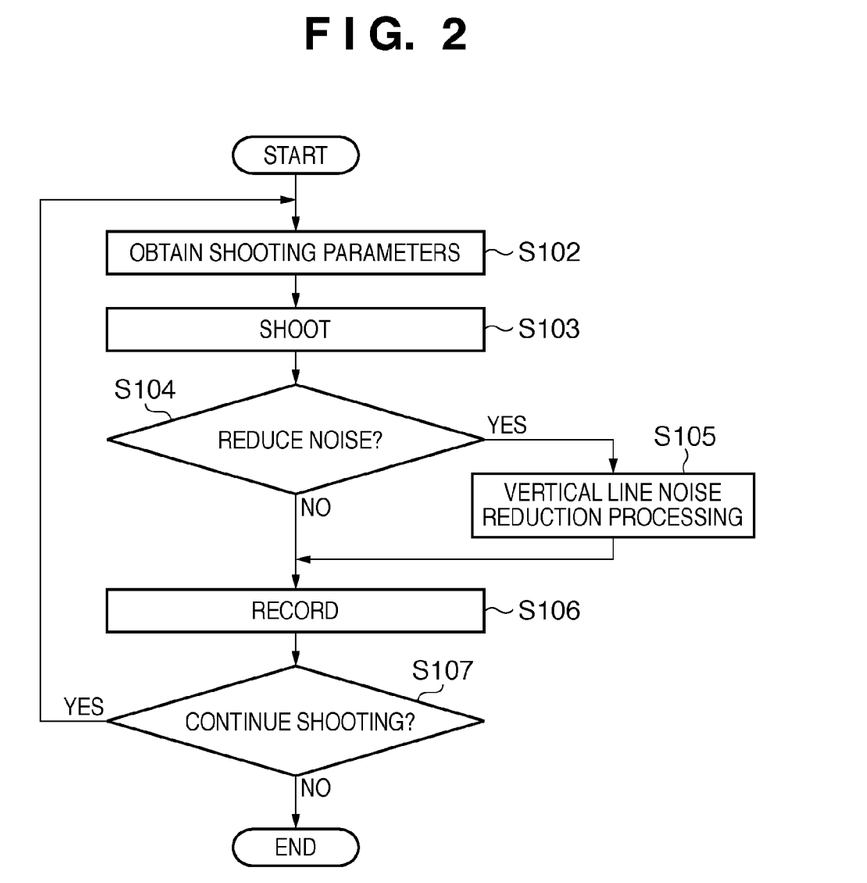
FIG. 2 is a flowchart which shows shooting processing according to the first embodiment of the present invention.

Next, the flow shooting processing in the first embodiment of the present invention will be described with reference to a flowchart of FIG. 2. It is to be noted that although a case of still image shooting is described in the embodiment, the same processing can also produce the same effect in moving image shooting or a live view mode.

First, in response to pressing a shutter button or the like, not shown, still image shooting is started. It is to be noted that at the start of the shooting, shooting conditions including the sensitivity, aperture value, and shutter speed are obtained as shooting data by a known method and stored in the storage area 19. Then, control exercised by the control unit 17 obtains a series of shooting parameters, including: the shooting conditions such as the sensitivity, aperture value, and shutter speed, as the shooting data stored in the storage area 19; and the ambient temperature of the image sensor 12 obtained by a thermistor 18 (step S102).

Then, with exposure setting based on the shooting parameters for the image sensing apparatus 10, shooting processing is carried out, including a series of operations from driving and reading the image sensor 12 to writing the image data into the storage area 20 (step S103).

Next, with reference to the noise reduction ON/OFF table 171 stored in the internal memory of the control unit 17, which is not shown in the figure, it is determined whether or not vertical line noise including crosstalk noise is to be reduced (step S104).

In the case of carrying out the noise reduction, the control unit 17 exercises control to read out the image data stored in the storage area 20 to reduce vertical line noise (step S105), and the corrected image data is again stored in the storage area 20. Then, the process proceeds to step S106, where the corrected image data stored in the storage area 20 is recorded on the recording medium 16. On the other hand, in the case of carrying out no noise reduction, the image data stored in the storage area 20 is directly recorded on the recording medium 16 without carrying out any noise reduction (step S106).

Next, in step S107, it is determined whether or not shooting such as continuous shooting is to be continued, and in the case of continuing shooting, the process is returned to the step S102 to repeat the processing described above. On the other hand, in the case of continuing no shooting, the shooting operation is ended at this point.

Next, a specific organization of the noise reduction ON/OFF table 171 which is used to determine whether or not noise reduction is to be carried out in step S104 will be described.

Figure 3A:
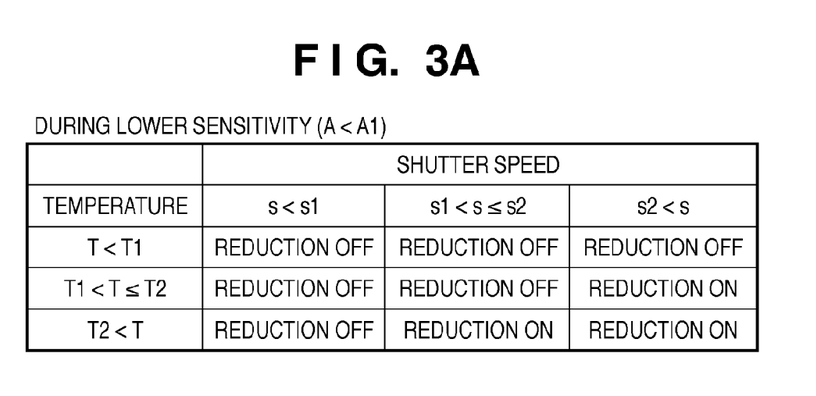
FIGS. 3A and 3B are diagrams which show a noise reduction ON/OFF table 171 according to the first embodiment of the present invention.
Figure 3B:
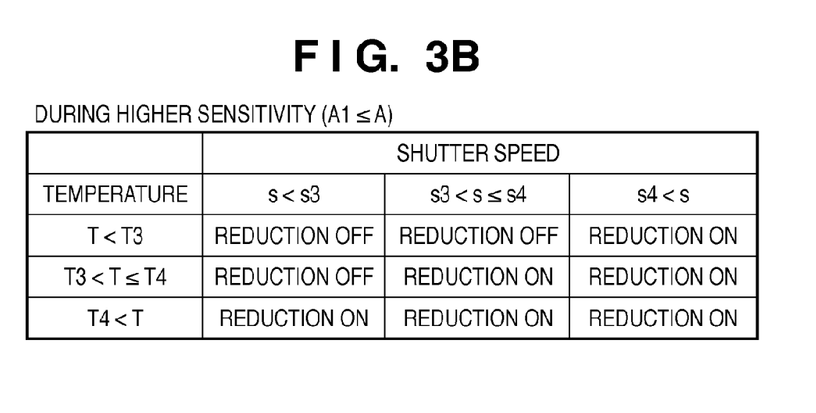

FIGS. 3A and 3B are tables which show an example of the noise reduction ON/OFF table 171 in the first embodiment.

The noise reduction ON/OFF table 171 is a lookup table in which is described switching between reduction ON and reduction OFF under conditions of three shooting parameters, temperature (T), shutter speed (s), and sensitivity (A), as shown in FIGS. 3A and 3B.

The control unit 17 can instantaneously determine reduction ON/OFF with reference to the areas of the noise reduction ON/OFF table 171 corresponding to the measured temperature and the set sensitivity and shutter speed.

In the example of the noise reduction ON/OFF table 171 shown in FIGS. 3A and 3B, the noise reduction ON/OFF table 171 is divided into two tables depending on the value of the sensitivity (A). More specifically, on the basis of a threshold value A1 of the sensitivity, FIG. 3A is applied in the case of lower sensitivities (A<A1), whereas FIG. 3B is applied in the case of higher sensitivities (A1≤A).

Furthermore, the temperature is divided into three regions depending on threshold values (T1, T2, T3, T4), whereas the shutter speed is likewise divided into three regions depending on threshold values (s1, s2, s3, s4). The threshold value for each of the sensitivity, temperature, and shutter speed is set at the visual balance point between the crosstalk noise and the fixed pattern noise of the image sensor in the first embodiment.

The noise reduction ON/OFF table 171 is typically designed such that the noise reduction is less likely to be switched ON under the lower sensitivity condition (A<A1) where vertical line noise due to crosstalk noise and the like are less likely to be noticeable. By contrast, the noise reduction is more likely to be switched ON under the higher sensitivity condition (A1≤A) where vertical line noises are more likely to be noticeable.

Furthermore, the crosstalk noise reduction becomes a factor causing degradation of the S/N ratio. Therefore, the noise reduction ON/OFF table 171 is typically designed such that the noise reduction is less likely to be switched ON under such conditions as faster shutter speed, and lower temperatures which cause smaller fixed pattern noise of the image sensor and intrinsically good S/N ratio. On the other hand, the noise reduction ON/OFF table 171 is designed such that the noise reduction is more likely to be switched ON under conditions that result in larger fixed pattern noise, that is, under conditions of slower shutter speed and higher temperatures.

Next, an example of the vertical line noise reduction processing carried out in step S105 will be described with reference to FIG. 4.

Figure 4:
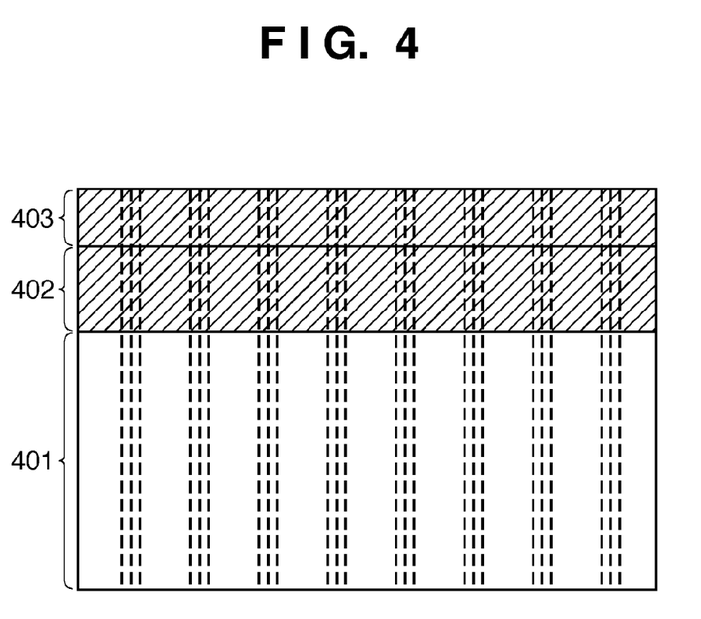
FIG. 4 is a schematic diagram for explaining vertical flaw reduction.

FIG. 4 is a schematic diagram which shows the pixel units of the image sensor 12 and corresponding vertical line noise in image signals read out from the image sensor 12 in order to describe the operation for the vertical line noise reduction.

Measuring signals in an OB unit 402 or a dummy pixel unit 403 (signals generated during reading with no accumulated signals in the image sensor 12) allows the level of crosstalk noise generated in an effective pixel unit 401 of the image sensor 12 to be measured.

While vertical line noise is caused by defects in the vertical transfer unit, vertical line noises are also caused by crosstalk noise generated at the timings of rising and dropping each of vertical transfer pulses applied to the vertical transfer unit, as already described.

As shown in FIG. 4, due to the causes described above, the effective pixel unit 401 has the same level of brightening (or darkening) caused in the same multiple columns. The same level of brightening (or darkening) caused in the same columns is also caused similarly in the OB unit 402 and the dummy pixel unit 403.

In the first embodiment, vertical line noise reduction is carried out by adding and averaging values for each column of image signals output from the OB unit 402 and subtracting the average values from the columns in the effective pixel unit 401.

It is to be noted that the vertical line noise reduction method described above is just one example thereof. The present invention is not limited to the vertical line noise reduction method described above, and it is possible to use known methods.

As described above, according to the first embodiment of the present invention, controlling with or without vertical line noise reduction on the basis of the temperature, sensitivity, and shutter speed during shooting can make crosstalk noise less noticeable.

Second Embodiment

Next, a second embodiment of the present invention will be described.

The vertical line noise reduction described in the first embodiment described above, by subtracting the average values for each column of image signals in the OB unit 402, becomes a factor causing degradation of the S/N ratio. Therefore, the vertical line noise reduction is not carried out under lower sensitivity conditions where vertical line noise is less noticeable.

However, recently, higher definition image sensors and following more microscopic pixels have progressively developed, decreasing the element sensitivity. Therefore, there are many cases where the amplification of a gain amplifier has to be set high to some extent even under such lower sensitivity conditions.

The second embodiment is characterized in that vertical transfer pulses are applied to the vertical transfer register such that vertical line noise is rendered less noticeable without decrease of the through rate or degradation of the S/N ratio even in an image sensing apparatus using a CCD that is not very high in element sensitivity.

The second embodiment according to the present invention is described below in detail with reference to the drawings. It is to be noted that an image sensing device in the second embodiment has the same configuration as that shown in FIG. 1 described in the first embodiment, and that the image sensor 12 therein has the same configuration as that shown in FIG. 9. Therefore, description of the configurations of the image sensing apparatus and image sensor 12 will be omitted here.

Figure 5:
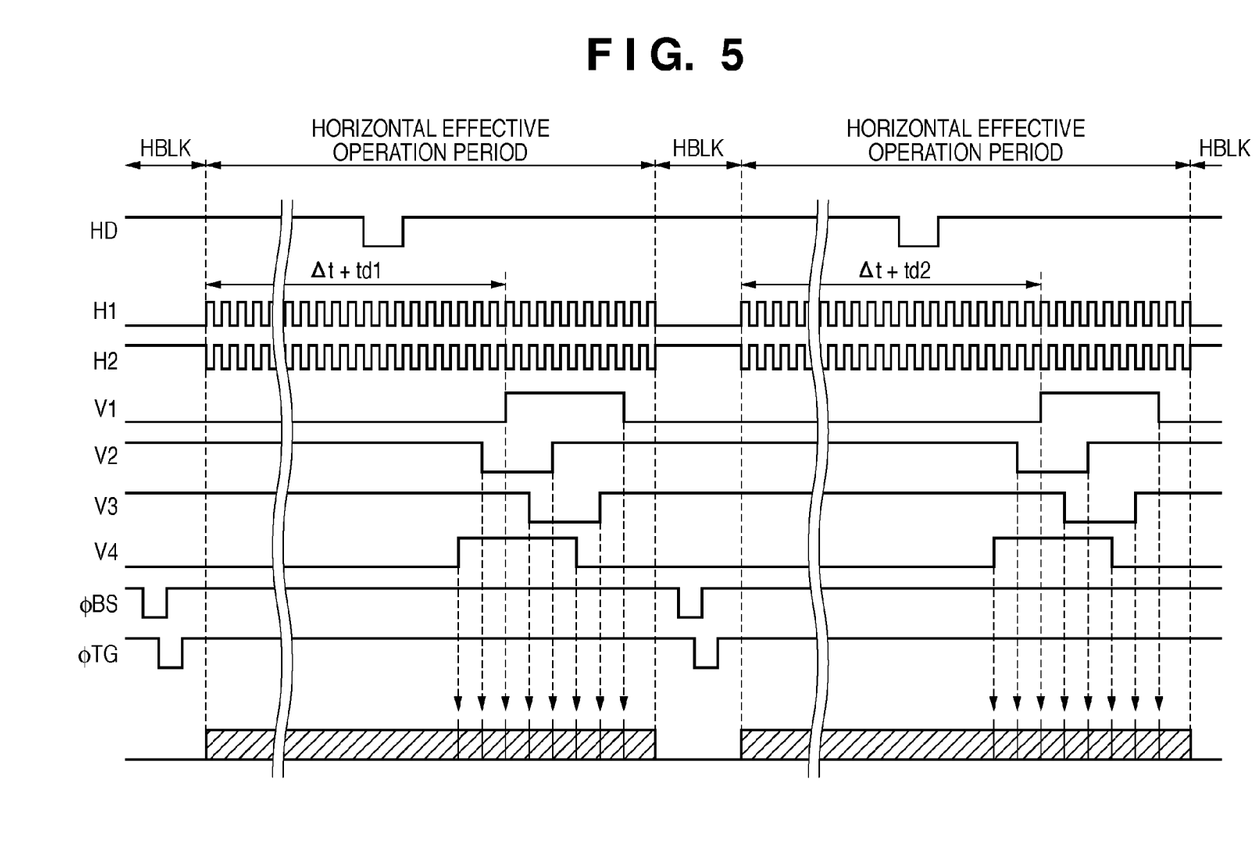
FIG. 5 is a timing chart during random V drive according to a second embodiment of the present invention.

FIG. 5 is a timing chart for explaining a driving method for a vertical transfer register (VCCD 2) in the second embodiment.

The second embodiment is characterized in that rising and dropping timings of vertical transfer pulses V1, V2, V3, V4 applied to the VCCD 2 are varied for each horizontal line. More specifically, the vertical transfer pulses are applied at different timings for each horizontal line while being randomly shifted, with respect to the timing of starting horizontal transfer in response to horizontal transfer pulses H1, H2 applied to a HCCD 3. Hereinafter, this vertical driving system is referred to as "random V drive".

More specifically, the time period from the timing of starting horizontal transfer in response to the horizontal transfer pulses H1, H2 to rising of the vertical transfer pulse V1 is generated by a timing generator 14 as a delay time ($\Delta t + td$), as shown in FIG. 5, where $\Delta t$ represents delay time with the same value fixed for each horizontal line, and the time td added to $\Delta t$ represents delay time with a value changed randomly for each line. In this case, the relative phases among the rising and dropping timings of the vertical transfer pulses V1, V2, V3, V4 remain unchanged among the horizontal lines.

The random V drive refers to a driving method in which vertical line noise is rendered visually less noticeable by randomly shifting and scattering, in horizontal positions for each horizontal line, crosstalk noise superimposed on image sensing signals at the rising and dropping timings of the vertical transfer pulses V1, V2, V3, V4.

Figure 6:
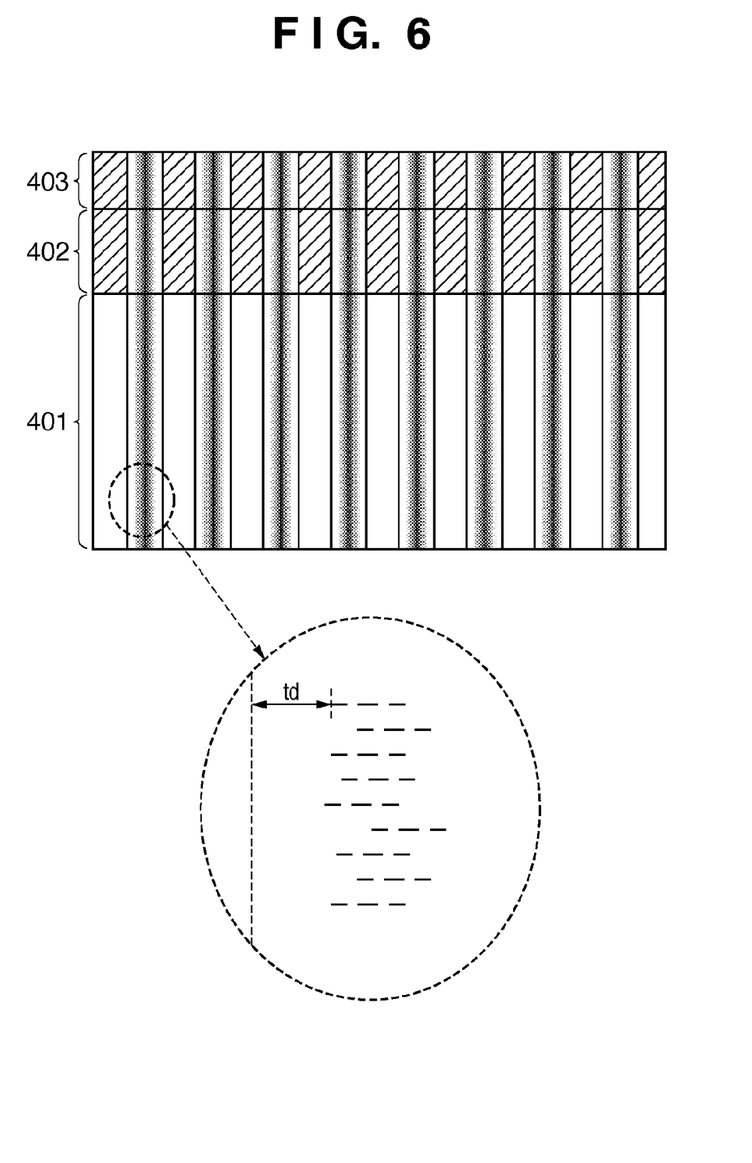
FIG. 6 is a schematic diagram illustrating vertical flaws during random V drive according to the second embodiment of the present invention.

FIG. 6 is a schematic diagram which shows the pixel units of the image sensor 12 and corresponding vertical line noises in image signals read out from the image sensor 12.

As shown in FIG. 6, crosstalk noise due to the random V drive is randomly distributed in horizontal positions during a predetermined duration td. Therefore, vertical line noise is increased in width but diluted, and thus rendered less noticeable as compared with vertical line noise caused during normal V drive as shown in FIG. 4.

Accordingly, the random V drive has a certain degree of attenuating effect against crosstalk noise. Nevertheless, in the determination of conditions for higher sensitivity settings, crosstalk noise will become recognizable as vertically uneven noise.

Thus, in the second embodiment according to the present invention, control is exercised to carry out vertical line noise reduction and random V drive such that the optimum attenuating effect is achieved under each condition against vertical line noise due to crosstalk.

Figure 7:
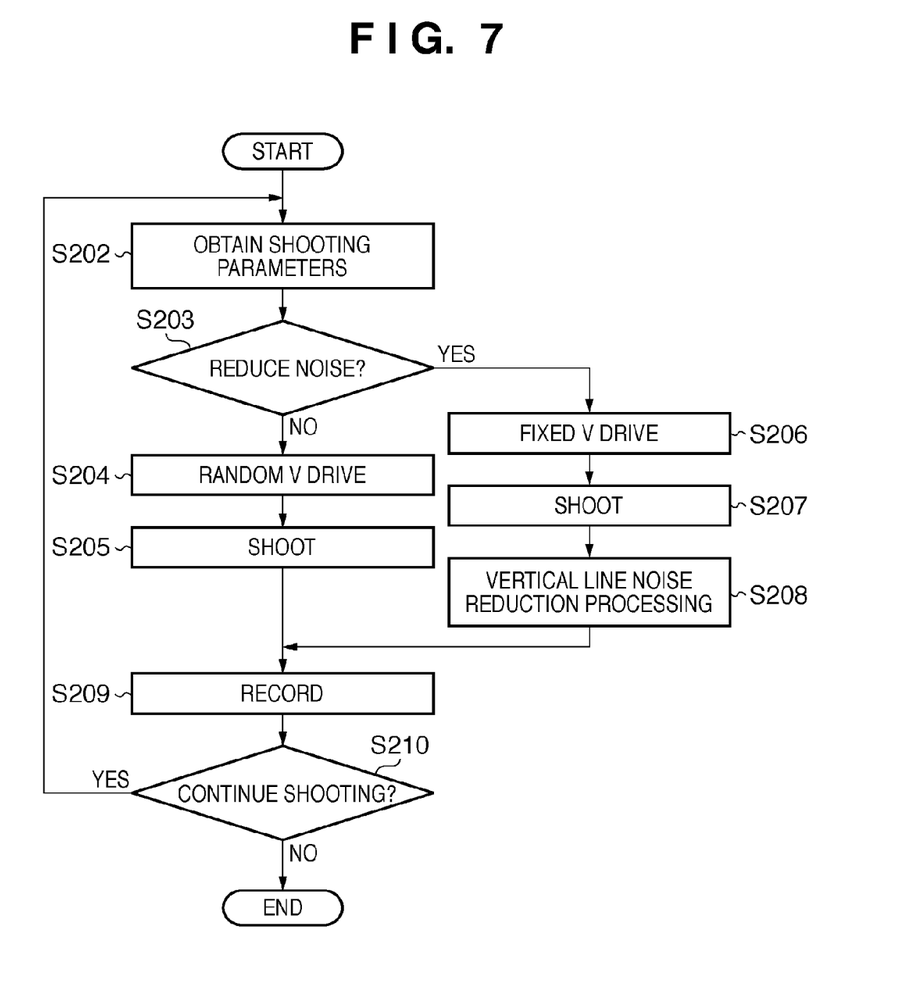
FIG. 7 is a flowchart which shows shooting processing according to the second embodiment of the present invention.

FIG. 7 is a flowchart which shows steps in the shooting processing in the second embodiment. It is to be noted that while a case of still image shooting is described in the embodiment, the same processing can also produce the same effect in moving image shooting or in a live view mode.

First, in response to pressing a shutter button or the like, not shown, still image shooting is started. It is to be noted that at the start of the shooting, shooting conditions including the sensitivity, aperture value, and shutter speed are obtained as shooting data by a known method and stored in the storage area 19. Then, control exercised by the control unit 17 obtains a series of shooting parameters including: the shooting conditions such as the sensitivity, aperture value, and shutter speed from the shooting data in the storage area 19; and the ambient temperature of the image sensor 12 obtained by a thermistor 18 (step S202).

Next, with reference to the noise reduction ON/OFF table 171 stored in the internal memory of the control unit 17, which is not shown in the figure, it is determined whether or not vertical line noise including crosstalk noise is to be reduced (step S203).

Then, in accordance with the noise reduction ON/OFF table 171, the control unit 17 controls the timing generator 14 to provide settings for carrying out random V drive in the case of carrying out no noise reduction (step S204). Then, with exposure setting based on the shooting parameters for the image sensing apparatus 10, shooting processing is carried out, including a series of operations from driving and reading the image sensor 12 using random V drive to writing image data into the storage area 20 (step S205). Then, the image data stored in the storage area 20 is directly recorded on the recording medium 16 without noise reduction (step S209).

On the other hand, in a case in which it is determined in step S203 that noise reduction is to be carried out in accordance with the noise reduction ON/OFF table 171, the process proceeds to step S206. In step S206, the control unit 17 controls the timing generator 14 to provide settings for driving the image sensor 12 by the driving method shown in FIG. 9 (referred to as "fixed V drive" herein), rather than random V drive. Then, with exposure setting based on the shooting parameters for the image sensing apparatus 10, shooting processing is carried out, including a series of operations from driving and reading the image sensor 12 by the set fixed driving method to writing image data into the storage area 20 (step S207)

Then, vertical line noise including crosstalk noise is reduced for the image data in the storage area 20 (step S208), and the corrected image data is again stored in the storage area 20. It is to be noted that the vertical line noise reduction may be carried out by, for example, the same method as in the first embodiment described above. Then, the process proceeds to step S206, where corrected image data stored in the storage area 20 is recorded on the recording medium 16.

Next, in step S210, it is determined whether or not shooting such as continuous shooting is to be continued, and in the case of continuing shooting, the process is returned to the step S202 to repeat the processing described above. On the other hand, in the case of continuing no shooting, the shooting operation is ended at this point.

As described above, according to the second embodiment, crosstalk noise can be rendered even less noticeable by carrying out the random V drive in a case in which no noise reduction is carried out, in addition to the effect of the first embodiment.

It is to be noted that while the VCCD 2 and the HCCD 3 follow four-phase drive and two-phase drive, respectively, in the first and second embodiments described above, it will be obvious that the present invention is also applicable to CCDs following systems other than these four-phase drive and two-phase drive.

Furthermore, in the present invention, the random V drive is described, with the vertical driving method taken as an example in which transfer operation by the VCCD 2 is carried out at a relatively random timing with respect to the timing of starting transfer by the HCCD 3 for each transfer carried out by the HCCD 3. However, it is not always necessary to carry out the transfer operation by the VCCD 2 at a random timing with respect to the timing of starting horizontal transfer by the HCCD 3. The timing of the vertical transfer operation by the VCCD 2 may be variable with a constant horizontal line period, rather than simply being fixed, with respect to the timing of starting horizontal transfer by the HCCD 3. This allows the position of any noise superimposed on effective pixel signals to be changed to render vertical line noise less noticeable.

Furthermore, in the first and second embodiments described above, still image shooting has been mainly described as an example. However, even though the method for reading the pixel units of the image sensor has a difference, such as addition or skipping of pixels, the same configuration also achieves the same effect in moving image shooting or in a live view mode by continuously repeating the processing flow for still image shooting.

Furthermore, in the first and second embodiments described above, instances of putting the present invention into practice in image sensing apparatuses have been described. However, the vertical line noise reduction control described in the first embodiment is also able to be exercised in image processing apparatuses which receive image data from the image sensing apparatus. In such cases, with a noise reduction ON/OFF table stored in the image processing apparatus, image data before noise reduction and shooting parameters, which are obtained in the image sensing apparatus, may be input into the image processing apparatus to carry out the noise reduction processing in the image processing apparatus.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-122775, filed on May 8, 2008, which is hereby incorporated by reference herein in its entirety.

What is claimed is:

1. An image sensing apparatus comprising:
an image sensor comprising two-dimensionally arranged photoelectric conversion elements, a first electric charge transfer unit for transferring in a vertical direction electric charge accumulated in the photoelectric conversion elements, and a second electric charge transfer unit for transferring in a horizontal direction the electric charge transferred from the first electric charge transfer unit;
a driving unit configured to drive the first and second electric charge transfer units such that electric charge transfer operation by the first electric charge transfer unit and electric charge transfer operation by the second electric charge transfer unit are carried out in parallel;
a noise reduction unit configured to carry out noise reduction for an image signal output from the image sensor, wherein noise reduced by the noise reduction includes noise caused by driving the first electric charge transfer unit by the driving unit; and
a control unit configured to determine whether or not to control the noise reduction unit to carry out the noise reduction based on at least one of shooting conditions and to control the driving unit such that the phase of a driving pulse of the first electric charge transfer unit with respect to a driving pulse of the second electric charge transfer unit is randomly shifted for each transfer of one horizontal line by the second electric charge transfer unit in a case in which the control unit determines not to control the noise reduction unit to carry out the noise reduction.

2. The image sensing apparatus according to claim 1, wherein the shooting conditions includes at least one of a shooting sensitivity, a shutter speed, and a temperature.

3. The image sensing apparatus according to claim 2, wherein the control unit controls the noise reduction unit so as to carry out no noise reduction in a case in which the temperature is equal to or lower than a first threshold value.

4. The image sensing apparatus according to claim 3, wherein the control unit controls the noise reduction unit so as to carry out noise reduction in a case in which the temperature is higher than a first threshold value and a shutter speed is slower than a second threshold value.

5. The image sensing apparatus according to claim 3, wherein a lower value is set as the first threshold value in a case in which the shooting sensitivity is high.

6. The image sensing apparatus according to claim 4, wherein a smaller value is set as the second threshold value in a case in which the shooting sensitivity is high.

7. A control method for an image sensing apparatus comprising an image sensor comprising two-dimensionally arranged photoelectric conversion elements, a first electric charge transfer unit for transferring in a vertical direction electric charge accumulated in the photoelectric conversion elements, and a second electric charge transfer unit for transferring in a horizontal direction the electric charge transferred from the first electric charge transfer unit, and a noise reduction unit configured to carry out noise reduction for an image signal output from the image sensor, wherein noise reduced by the noise reduction includes noise caused by driving the first electric charge transfer unit,
wherein whether or not to control the noise reduction unit to carry out the noise reduction is determined base on at least one of shooting conditions and the first and second electric charge transfer units are controlled such that electric charge transfer operation by the first electric charge transfer unit and electric charge transfer operation by the second electric charge transfer unit are carried out in parallel, and the phase of a driving pulse of the first electric charge transfer unit with respect to a driving pulse of the second electric charge transfer unit is randomly shifted for each transfer of one horizontal line by the second electric charge transfer unit in a case in which it is determined not to control the noise reduction unit to carry out the noise reduction.

8. The control method according to claim 7, wherein the shooting conditions includes at least one of a shooting sensitivity, a shutter speed, and a temperature, and
the noise reduction is carried out for an image signal output from the image sensor, in a case in which it is determined that the noise reduction is to be carried out, and
the noise reduction is not carried out in a case in which it is determined that the noise reduction is not to be carried out.

* * * * *